Patented Aug. 9, 1927.

1,638,061

UNITED STATES PATENT OFFICE.

ERIK LUDVIG RINMAN, OF DJURSHOLM, SWEDEN.

METHOD OF DRY DISTILLATION OF ALKALIZED WASTE LIQUOR FROM THE SODA CELLULOSE MANUFACTURE.

No Drawing. Application filed June 4, 1924, Serial No. 717,739, and in Sweden June 6, 1923.

The present invention relates to an improvement on the processes previously described in my United States Patents No 1,196,290 of Aug. 29, 1916, and No. 1,347,713 of July 27, 1920, of dry distillation of alkalized waste liquor from the soda cellulose manufacture, i. e. waste liquor to which a strong base, such as hydrate of lime, has been added. According to the last mentioned patent the dry distillation is run to a temperature of about 500° C., so that all organic matters in the waste liquor are distilled over or charred, in order that it shall be possible to use the residue for the preparation of fresh boiling lye. When carrying out such dry distillation on a manufacturing scale it has been found, however, that running the dry distillation to such high temperature requires a long time and much fuel without yielding a corresponding economic gain in the way of chemical products.

Now, the present invention has for its purpose to provide a process according to which such dry distillation may be carried out in such manner that while the distillation still yields the most valuable organic substances in the waste liquor, it is performed with a less consumption of fuel and thus at a less cost, and according to which the retort residue of the dry distillation is freed from the organic matters remaining in the same in a simple manner which renders said residue particularly adapted to be utilized for the preparation of fresh boiling lye and effects a saving of the lime necessary for such preparation.

The present process consists principally in that the dry distillation of waste liquor from the soda cellulose manufacture previouly alkalized by an addition of hydrate of lime, is discontinued at a temperature of approximately 400° C. as soon as the most valuable organic substances in the waste liquor have distilled over, after which the residue in the retort, preferably after cooling the dry distillation furnace so that the chemical reactions in the same cease, is taken out and granulated or pulverized, and subjected to combustion so that the organic substances remaining in the same are consumed or charred and the lime present in said residue is burnt, partly or completely, to calcium monoxide, CaO. In this way the advantage is attained that when the residue thus burnt is afterwards used for the preparation of fresh boiling lye, the calcium monoxide is in a ready state to regenerate the soda carbonate in the residue to form sodium hydrate, so that the quantity of lime required for regenerating the soda in the residue to form fresh lye is correspondingly reduced. The destruction of the organic substances remaining in the residue in the retort is also necessary for the reason that a very difficultly filtered sludge is formed when preparing fresh lye from the residue if it contains uncharred organic substances. The combustion of the organic substances may be carried so far that not only the organic substances but also carbon present in the retort residue is consumed.

The burning of the retort residue above referred to is preferably performed in a rotary furnace, for instance one of that type in which the waste liquor is usually burnt in a soda cellulose plant or a sulphate plant. It is important to obtain a high temperature at the final combustion of the retort residue if it is desired to obtain the lime in the same burnt without a large consumption of fuel. This may be effected in two ways. The one way is to granulate the "soda coal", preferably to pieces of 3 mm. size at the most, and burn the same at a temperature of about 750° C., when approximately three-fourths of the lime in the soda coal become caustic. Such burning is most suitably performed in a rotary furnace and with preheated air. The other way is to finely pulverize the soda coal and burn the same as powdered fuel with preheated air at a temperature of 1000° to 1200° C., when all lime becomes caustic. It is true that the soda melts but according as the lime becomes burnt it absorbs the melted soda, so that a solid tough mass is obtained. In a rotary furnace said mass forms balls during such burning, which balls are easily dissolved, however, if they are introduced, without being cooled, in a mixing apparatus for preparation of lye.

In respect of the details of the method the following may be observed: The dry distillation need not be driven to a higher temperature than about 400° C. in order that all acetone, methyl-ethyl ketone, and methyl alcohol shall be distilled over. When the furnace is afterwards cooled, for instance by spraying water in a finely divided state into the same, to 250° to 300° C., all chemical reactions in the same cease and the oils are driven off together with the steam formed by the water, so that the furnace may afterwards be opened without danger of explosion. If partial cooling of the distillate is employed it is more suitable to use warm diluted condensate thus obtained, instead of water, for cooling the furnace. Such cooling is most easily performed with such distillation furnaces in which the gases are kept in movement by means of a fan. When the retort residue has been taken out from the furnace, it is suitably crushed and granulated or pulverized in the manners above set forth, depending upon what method of burning it is desired to use. For the burning a somewhat longer rotary furnace than that usually employed in soda cellulose plants is preferably used.

When the gases of combustion formed during the burning of the retort residue, are free from sulphur they may be used with advantage for drying and preheating to about 300° C. the lime sludge formed during the preparation of fresh lye. If said sludge is dried with gases of combustion free from sulphur, the powder of calcium carbonate thus dried and preheated may be burnt to unslaked lime with the use of ordinary coal fuel, without the lime absorbing sulphur. The wet sludge, on the other hand, absorbs sulphur from gases of combustion containing sulphur, and for this reason the use of ordinary sulphurous fuel for the drying of the sludge causes contamination of sulphur in re-burnt lime prepared in this manner.

During the burning of the retort residue from wood cellulose waste liquors more heat is obtained than that required for the drying of the lime sludge. In said case it is therefore suitable first to utilize the gases of combustion for generating steam in a boiler or for preheating air and afterwards to use the same for drying the lime sludge.

I claim:

1. The process of treating waste liquor from the soda cellulose manufacture, which consists in alkalizing said waste liquor by the addition of hydrate of lime, dry distilling said alkalized waste liquor in the presence of steam and interrupting such dry distillation at a temperature of about 400° C., and afterwards removing and granulating the retort residue to pieces of about 3 mm. size and burning such granulated residue at a temperature of about 750° C. so that all organic substances in the same are consumed and the lime present in said residue is burnt to calcium monoxide.

2. The process of treating waste liquor from the soda cellulose manufacture, which consists in alkalizing said waste liquor by the addition of hydrate of lime, dry distilling said alkalized waste liquor in the presence of steam and interrupting such dry distillation at a temperature of about 400° C., cooling the dry distillation furnace, and afterwards removing and granulating the retort residue to pieces of about 3 mm. size and burning such granulated residue at a temperature of about 750° C. so that all organic substances in the same are consumed and the lime present in said residue is burnt to calcium monoxide.

3. The process of treating waste liquor from the soda cellulose manufacture, which consists in alkalizing said waste liquor by the addition of hydrate of lime, dry distilling said alkalized waste liquor in the presence of steam and interrupting such dry distillation at a temperature of about 400° C., cooling the dry distillation furnace by spraying water in the same, and afterwards removing and granulating the retort residue to pieces of about 3 mm. size and burning such granulated residue at a temperature of about 750° C. so that all organic substances in the same are consumed and the lime present in said residue is burnt to calcium monoxide.

4. The process of treating waste liquor from the soda cellulose manufacture, which consists in alkalizing said waste liquor by the addition by hydrate of lime, dry distilling said alkalized waste liquor in the presence of steam and interrupting said dry distillation at a temperature of about 400° C., cooling the dry distillation furnace, and afterwards removing and granulating the retort residue to pieces of about 3 mm. size and burning said granulated residue at a temperature of about 750° C., so that all organic substances and also carbon present in the residue are consumed and the lime present in said residue is burnt to calcium monoxide.

ERIK LUDVIG RINMAN.